Feb. 28, 1967   N. E. WILLIAMS ETAL   3,306,332
REPAIRING OF RADIAL CORD TIRES
Filed March 29, 1965   3 Sheets-Sheet 1
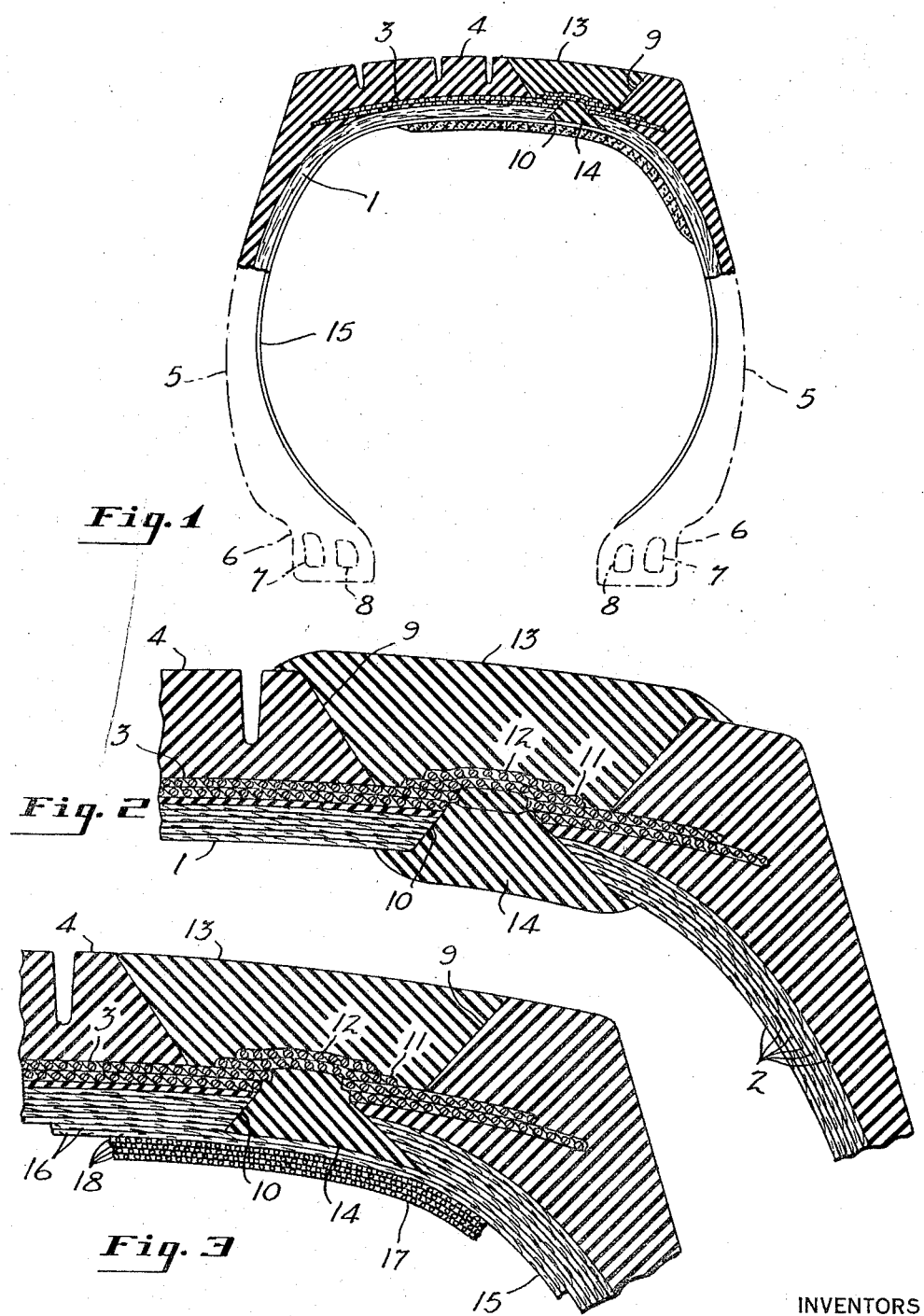
INVENTORS
Norman E. Williams
David D. Dewey
BY McCoy, Greene, Medert
& Te Grotenhuis
ATTORNEYS Feb. 28, 1967 N. E. WILLIAMS ETAL 3,306,332
REPAIRING OF RADIAL CORD TIRES
Filed March 29, 1965 3 Sheets-Sheet 2
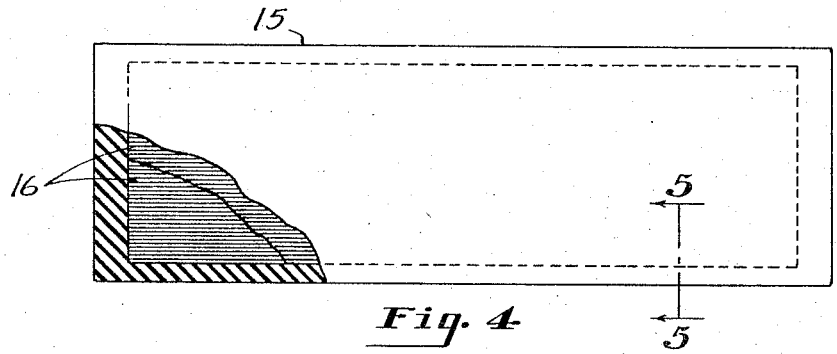
Fig. 4
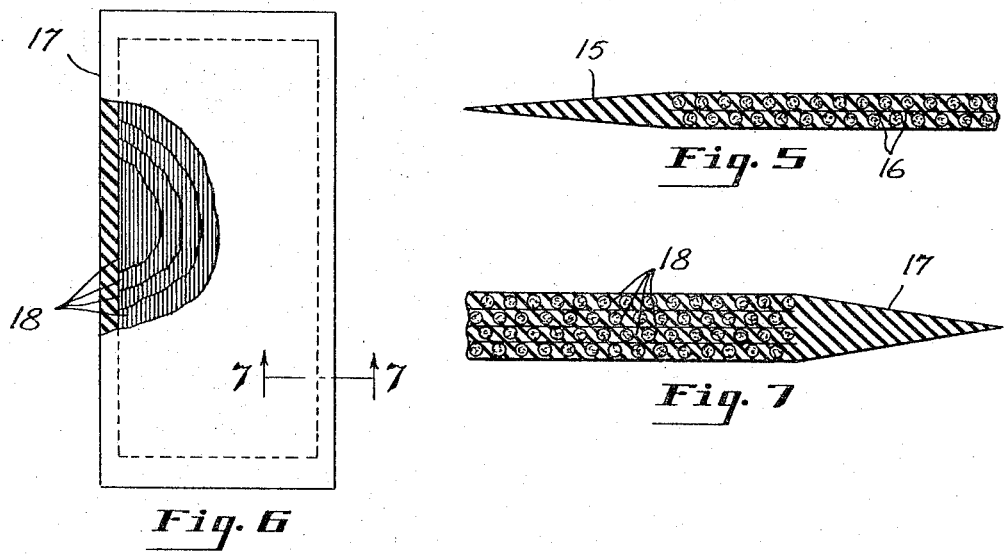
Fig. 5
Fig. 6
Fig. 7
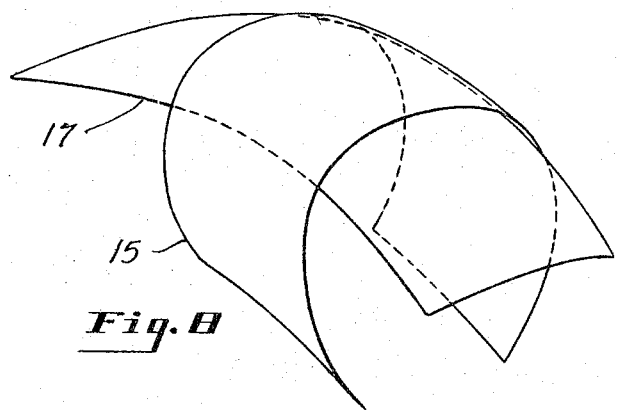
Fig. 8
INVENTORS
Norman E. Williams
David D. Dewey
BY McCoy, Greene, Medert
& TeGrotenhuis
ATTORNEYS

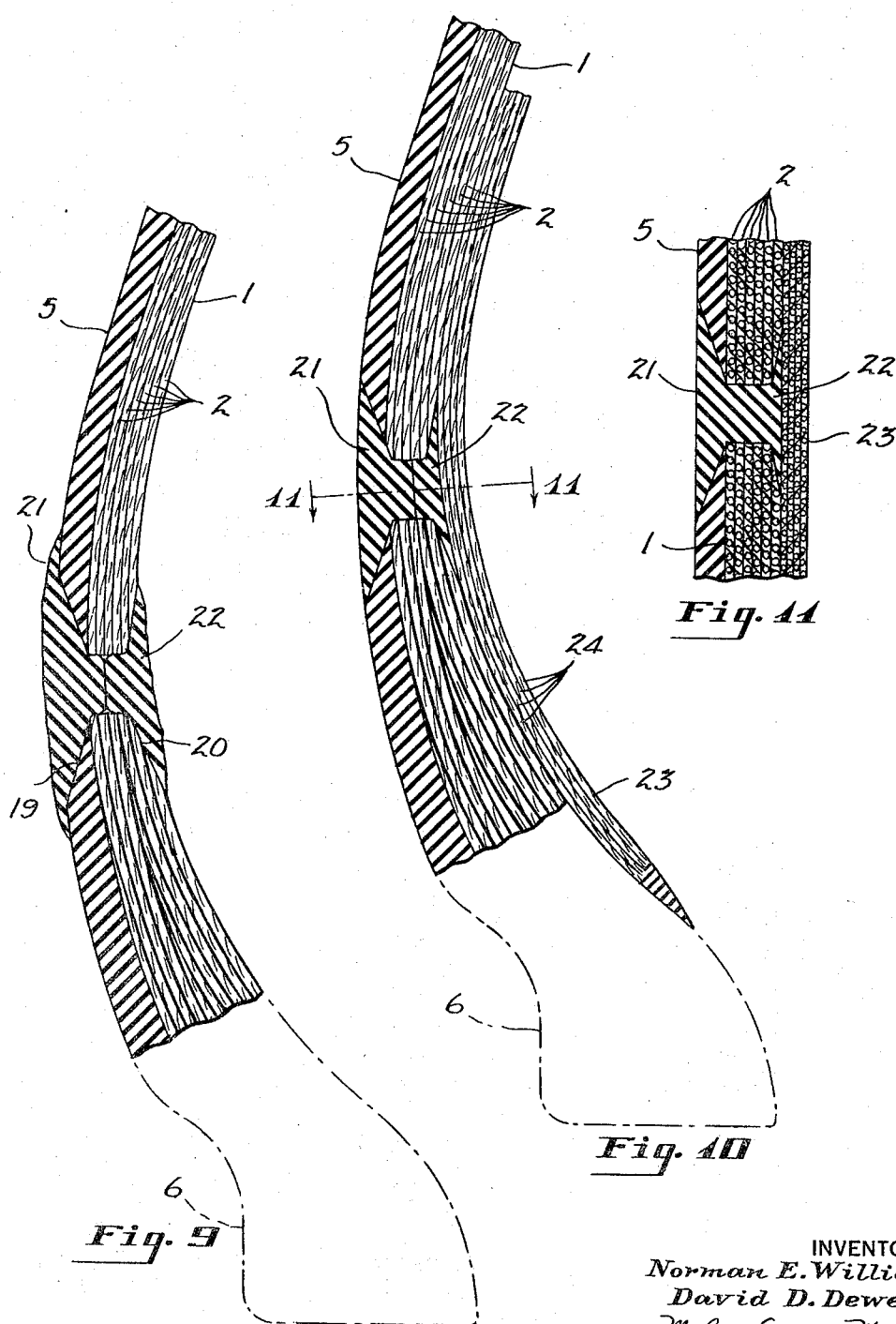

United States Patent Office 3,306,332
Patented Feb. 28, 1967

3,306,332
REPAIRING OF RADIAL CORD TIRES
Norman E. Williams, Rootstown, and David D. Dewey, Akron, Ohio, assignors to The General Tire & Rubber Company, Akron, Ohio, a corporation of Ohio
Filed Mar. 29, 1965, Ser. No. 443,410
7 Claims. (Cl. 152—367)

This invention relates to the repair of damaged pneumatic tires having a carcass portion formed of superposed plys of rubber coated cords which are oriented in radial planes relative to the axis of rotation of the tire. The invention provides a reinforced patch for tires of radial cord construction which enables damaged tires to be repaired and used throughout a normal tire lifetime. The invention also provides a method for applying the patch to the tire to achieve an effective repair.

Pneumatic tires having a carcass portion formed of superposed plys of rubber coated cords which are oriented in radial planes have been found to have many performance advantages over more conventional tires in which the cords run diagonally through the tire carcass from bead to bead. Radial cord tires have been particularly effective as truck tires which must bear heavy loads and be able to withstand severe operational conditions. Such tires provide a smoother ride; however, they have less later stability than conventional tires. In order to compensate for this reduced lateral stability, it is usually necessary to provide a circumferential breaker strip around the outside of the carcass plys. The breaker strips usually consist of two or more layers of wire cords embedded in rubber, adhered to the outermost ply layer. These strips have circumferential wire cords which provide needed lateral stability to the tire. The tread band is normally applied directly over the breaker strip. This construction, however, does not lend itself to ordinary tire repair during the useful life of a tire, since conventional methods do not provide the necessary strength.

When repairing conventional truck tires, the breaker strips are not repaired, and all of the reinforcement is placed on the inside of the tire. The reinforcement normally consists of a sheet of superposed plys of cords with each ply layer having cords running at approximately the same angle as the cords of the plys in the tire carcass. Performance tests on patched radial cord tires, however, have shown the conventional patching methods to be unsatisfactory.

The patch construction and method of repair embodied in the present invention provide a novel solution to this problem and enable damaged radial cord pneumatic tires to be repaired and used throughout the normal life of the tire.

Where tire damage occurs in the tread area, the invention provides for the reinforcing of the damaged area around the circumferential breaker strip with embedded layers of reinforcing wire cords. The interior of the tire casing is reinforced with one sheet of superposed plys of tire cord material with the cords oriented in radial planes and extending from bead to bead and a second sheet of superposed plys of cord material with the cords oriented circumferentially. This prevents the tire from bulging due to damage to the radial cords. These reinforcing sheets inside the tire casing may be cured using well known chemical curing techniques by mounting the tire on a conventional wheel rim inflating an inner tube within the casing to a suitable pressure and allowing the sheets to cure in this condition for several hours.

Where the damage occurs in the sidewall area, a reinforcing sheet consisting of superposed plys of tire cord material is placed in radial relationship inside the tire extending from bead to bead. This reinforces the damaged radial cords in the carcass and keeps the ends of the reinforcing sheet out of the high flex area of the sidewall. The circumferential reinforcing sheet is not needed in this case since bulging normally would not occur in the sidewall area. Curing may be accomplished in the same manner described above.

It is among the objects of the present invention to provide a patch construction for pneumatic tires having a carcass portion formed of rubber coated cords located in radial planes relative to the axis of rotation of the tire, and also to provide a method of repairing damaged areas of such tires.

Another object of the invention is to provide a method of repairing radial cord pneumatic tires which provides a strong sturdy repaired tire carcass which will enable the tire to be used throughout its normal lifetime.

It is also an object of the present invention to provide a patch construction for radial cord pneumatic tires which may be applied in a minimum of time using tools normally available in automotive shops and which does not require the use of complete tire vulcanizing molds.

Other objects, uses and advantages of the invention will be apparent from the following detailed description and drawings, wherein like parts are identified by like numerals and wherein:

FIGURE 1 is a transverse sectional view of a radial cord pneumatic truck tire having a damaged area located in the tread area which has been repaired utilizing the patch construction of the present invention;

FIGURE 2 is a fragmentary transverse sectional view on an enlarged scale of a radial cord pneumatic truck tire of the type shown in FIGURE 1, showing the patch build-up for repairing the damaged area prior to curing of the patch and application of the interior tire cord reinforcing sheets;

FIGURE 3 is a fragmentary transverse sectional view on an enlarged scale of the tire shown in FIGURE 1, illustrating the construction of the completed patch in the tread area;

FIGURE 4 is a top elevational view of a two-ply cord reinforced repair sheet used as the radial reinforcing sheet in the repaired tire of FIGURE 1, with parts broken away and shown in section;

FIGURE 5 is a fragmentary transverse sectional view taken on the line 5—5 of FIGURE 4;

FIGURE 6 is a top elevational view of a four-ply cord reinforced repair sheet used as the circumferential reinforcing sheet in the repaired tire of FIGURE 1, with parts broken away and shown in section;

FIGURE 7 is a fragmentary transverse sectional view taken on the line 7—7 of FIGURE 6;

FIGURE 8 is a perspective view illustrating the relationship of the reinforcing sheets on the inside of the tire;

FIGURE 9 is a fragmentary transverse sectional view of a radial cord pneumatic tire having a damaged area in the sidewall which is in the process of being repaired utilizing the method and patch construction embodied in the present invention;

FIGURE 10 is a fragmentary sectional view of the tire shown in FIGURE 9, showing the completed repair of the sidewall damage utilizing the patch construction of the present invention;

FIGURE 11 is a fragmentary sectional view taken on the line 11—11 of FIGURE 10.

Referring more particularly to the drawings, FIGURES 1 through 3 illustrate an application of the method and patch construction of the invention for repairing a damaged radial cord pneumatic truck tire wherein the damage has occurred in the tread area. The tire shown includes a carcass 1 formed of six superposed plies 2 of cords embedded in rubber wherein the cords extend from bead to bead in radial planes, a breaker strip 3 composed of two circumferential bands of continuous circular wire cords embedded in rubber, a tread band 4, sidewalls 5 and beads 6 having two circular wire bead rings 7 and 8 embedded therein.

The tire has a damaged portion extending through the wall of the tire in the tread area, as best shown in FIGURES 2 and 3. The portion of the damaged area above the breaker strip 3 has been skived out to provide a conical cavity 9 with the sides cut to about a 60° angle. On the interior of the tire wall in the vicinity of the damage, the carcass has been skived out to provide a conical cavity 10 having sidewalls cut at about a 40° angle. Since the damage extended entirely through the wall of the tire, some of the radial cords in the carcass 1 have been cut out.

FIGURE 2 shows the initial stages of the repair in which two small pieces 11 and 12 of wire cord reinforcement have been placed over the breaker strip to provide reinforcement in the damaged area. A plug 13 of suitable vulcanizable tack gum material has been pressed into the outer cavity 9 with its surface extending about one-fourth of an inch above the surface of the tread. A similar plug 14 of vulcanizable tack gum material has been placed in the interior cavity 10 with its surface also projecting into the interior cavity of the tire about one quarter of an inch.

FIGURE 3 illustrates the completed repair wherein the plugs 13 and 14 have been heat cured and a vulcanizable reinforcing sheet 15 formed of two superposed plies 16 of tire carcass material having cord reinforcement has been placed inside the tire casing over the plug 14 with the cords located in radial planes relative to the axis of the tire so that the cords run substantially from bead to bead. The cords may be formed of any suitable tire cord material such as steel wire or nylon. This construction keeps the ends of the radial reinforcing sheet out of the high stress areas of the tire. The construction of the reinforcing sheet 15 is shown in more detail in FIGURES 4 and 5.

Positioned over the two-ply radial reinforcing sheet 15 is a second reinforcing sheet 17 consisting of four plys 18 of cord reinforced carcass fabric. The sheet 17 is placed over the plug 14 with the cords running circumferentially of the tire carcass, as best shown in FIGURES 1 and 3. This construction prevents the repaired area from bulging when the tire is inflated to operating pressures on a vehicle. Otherwise, a high spot or bulge might occur in the tread band due to the weakening of the carsass caused by damage to the radial cords. The construction of the reinforcing sheet 17 is shown in more detail in FIGURES 6 and 7. The sheets are adhered to the inner wall of the tire casing using suitable rubber cement and may be chemically cured using curing agents well known to those skilled in the art by mounting the tire on a conventional wheel rim, inflating an inner tube inside the tire and allowing the tire to remain in this condition for the required curing time.

FIGURE 8 shows the relationship of the two reinforcing sheets 15 and 17 in the tire when the patch is completed.

FIGURES 9 through 11 illustrate an application of the patch construction and repair method embodied in the present invention to tire damage which occurs in the sidewall of a radial cord pneumatic truck tire of the type shown in FIGURE 1. This type of patch differs from the patch shown in FIGURES 1 to 3 in two ways. First of all, there is no need to reinforce the breaker strip 3 since it does not extend to the sidewall area of the tire casing. Secondly, there is no need to provide a circumferential reinforcing sheet because the forces tending to spread the radial cords are relatively small in the sidewall area. Accordingly, all that is necessary to provide the desired reinforcement is a four-ply reinforcing sheet of cord material such as shown in FIGURES 6 and 7, which is positioned with the cords in a radial relationship in the tire casing.

As shown in FIGURES 9 and 10, the damage area is skived out on both the interior and exterior surfaces of the tire casing to provide conical shaped cavities 19 and 20. The angle of the cut is approximately 60° in both instances. The skived out area is then filled with plugs 21 and 22 of tack gum material, as shown in FIGURE 9, with the gum material extending outwardly about one quarter inch from the surface of the sidewall 5 and inwardly about one quarter inch from the interior surface of the casing. This portion of the patch may then be heat cured using a C-clamp with steam heat to provide the required vulcanizing temperature. After the heat curing, a reinforcing sheet 23 formed of four plys 24 of rubber coated nylon cords, is positioned in radial orientation in the interior of the tire casing with its cords running from bead to bead. The sheet 23 is then chemically cured to provide the construction shown in FIGURES 10 and 11. It will be noted in FIGURE 11 that the nylon cords extend in radial planes relative to the axis of rotation of the tire. The chemical curing of the interior sheet and adhering of the sheet to the tire casing may be accomplished as discussed above.

The method for repairing damaged tires according to the present invention will be best understood from the following illustrative examples:

*Example I*

A damaged radial cord pneumatic truck tire of the type shown in the drawings is repaired as follows:

The damaged area, in the form of a perforation in the tread area, is prepared by skiving out the damaged tread rubber to form a conical cavity having outwardly feathered sidewalls cut to about a 60° angle. The cavity thus prepared extends into the carcass as far as the wire breaker strip where at least one inch of one wire breaker is exposed. All broken or frayed wires are cut and ground down level with the walls of the cavity.

The tire is then placed on a tire spreader of conventional construction and a conical cavity is skived out on the inside of the carcass having walls feathered outwardly to about a 40° angle. The broken radial cords are cut and rasped level with the walls of the cavity. The walls of the inside cavity are then brushed with a wire brush. Also, the interior of the casing is wire brushed over an area approximately one inch surrounding the cavity.

The entire skived area is then cleaned utilizing a suitable solvent to remove grease and other deposits. The exposed breaker wire is then coated with a suitable metal cord cement which is allowed to dry. A suitable cement is sold under the trade name "C–188 Metal Cord Cement," manufactured and sold by The General Tire & Rubber Company, of Akron, Ohio. This is a natural rubber base material which contains an additive for adhering the rubber to the metal cords. After the metal cord cement is dry, the exposed rubber areas of the cavities are coated with a suitable rubber cement such as a cement sold under the trade name "C–158 Cement," also manufactured and sold by The General Tire & Rubber Company, of Akron, Ohio. Such cements are normally based on natural rubber containing carbon black, and a phenol formaldehyde resin is used as a tackifier. Other suitable rubber cements may be used as will be obvious to those skilled in the art.

A cut-to-size sheet of rubber coated wire cord material is then fitted into the outside cavity above the exposed wire of the breaker strip. The wires in the cut-to-size sheet are oriented in the same direction as those in the breaker strip. A second cut-to-size wire cord sheet of slightly smaller dimensions is placed over the first sheet with its cords also parallel to those of the breaker strip. The exposed wire ends of these sheets are covered with cushion gum before insertion.

The cavities are then filled with a tack gum, preferably a soft pliable natural rubber gum which is relatively fast curing. The gum should contain a comparatively high amount of accelerator. A suitable sum is sold under the trade designation "R-49 Tack Gum" which is manufactured by The General Tire & Rubber Company, of Akron, Ohio. Other gums may, of course, be used for the patch material as will be obvious to those skilled in the art. The tack gum is built up to about one-quarter inch above both the inside and outside surfaces of the tire casing.

The tack gum material is then heat cured using a C-clamp of conventional type. Curing time is about 1½ minutes using 50 pounds of steam at 297° F.

The next step is the application of the interior reinforcing sheets. The area inside the tire casing over which the sheets are to be applied is brushed with a wire brush to assure good adhesion during curing. A fast cure rubber cement is then coated over the brushed area and allowed to dry. Next, the area is coated with a liquid vulcanizer and allowed to dry. Suitable liquid vulcanizers are well known to those skilled in the art and are discussed on pages 390 and 391 of Whitby, Synthetic Rubber (1954).

A suitable two-ply nylon cord reinforcing sheet of the type shown in FIGURES 4 and 5 is positioned in the tire casing over the interior cavity with the cords oriented in radial planes relative to the axis of rotation of the tire. The edges of the sheet are stitched in place removing all entrapped air. A coat of liquid vulcanizer is applied to the top of the patch and allowed to dry.

Four-ply nylon cord reinforcing sheet of the type shown in FIGURES 6 and 7 is centered over the radial sheet with its cords oriented circumferentially and the edges stitched to the casing.

The repaired tire is then placed on a conventional wheel rim with a tube inside which is inflated to about 35 pounds of pressure. The patch is allowed to cure in this condition for about 12 hours.

*Example II*

A radial wire cord pneumatic truck tire of the type shown in FIGURE 1 having damage in the sidewall area is repaired as follows:

The damaged area is skived out to form inside and outside conical cavities, as shown in FIGURE 9 of the drawings. The cavities are then treated, filled with tack gum and cured in the manner described above in Example I.

Since the damage is in a low stress area of the tire, it is not necessary to use a circumferential reinforcing sheet as in the case of damage in the tread area. Accordingly, only a four-ply sheet of the type shown in FIGURES 6 and 7 need be used. This sheet is oriented with its cords in radial planes relative to the axis of rotation of the tire, as shown in FIGURES 10 and 11. The interior area of the tire carcass, which will underlie the reinforcing sheet, is then coated with fast cure cement and liquid vulcanizer, and the sheet is located in position and stitched down around its edges. The tire is then placed on a conventional wheel rim with an inner tube inserted and inflated to 35 pounds pressure in the manner described above in Example I.

It is to be understood that in accordance with the provisions of the patent statutes, variations and modifications of the specific devices herein shown and described may be made without departing from the spirit of the invention.

Having thus described our invention, what we claim is:

1. In a pneumatic tire having a carcass terminating in circular beads and being formed of superposed plies of rubber reinforced with cords lying in radial planes, a patch including a reinforcing sheet formed of parallel cords embedded in rubber, said sheet being adhered to the interior wall of said tire with its parallel cords oriented in radial planes and extending from bead to bead to reinforce said carcass in the vicinity of said patch.

2. In a pneumatic tire as defined in claim 1 a patch as described wherein said reinforcing sheet is formed of four superposed plies.

3. In a pneumatic tire having a carcass terminating in circular beads and being formed of superposed plies of rubber reinforced with cords lying in radial planes, a patch including a radial reinforcing sheet formed of parallel cords embedded in rubber, said radial sheet being adhered to the interior wall of said tire with its parallel cords oriented in radial planes and extending from bead to bead, and a circumferential reinforcing sheet formed of parallel cords embedded in rubber, said circumferential sheet being adhered to the interior wall of said tire with its parallel cords oriented circumferentially of said tire, said sheets providing reinforcement in the vicinity of said patch.

4. In a pneumatic tire as defined in claim 3 a patch as described wherein said radial reinforcing sheet is formed of two superposed plies and said circumferential reinforcing sheet is formed of four superposed plies.

5. In a pneumatic tire having a carcass terminating in circular beads and being formed of superposed plies of rubber reinforced with cords lying in radial planes, a wire cord reinforced circumferential breaker strip surrounding said carcass, and a circumferential tread band, a patch in the vicinity of said tread band and including at least one layer of cord fabric located over a damaged portion of said breaker strip and embedded in said tread band, a radial reinforcing sheet formed of parallel cords embedded in rubber, said radial sheet being adhered to the interior wall of said tire with its parallel cords oriented in radial planes and extending from bead to bead, and a circumferential reinforcing sheet formed of parallel cords embedded in rubber, said circumferential sheet being adhered to the interior wall of said tire with its parallel cords oriented circumferentially of said tire, said sheets providing reinforcement in the vicinity of said patch.

6. In combination, a pneumatic tire having a carcass terminating in circular beads and being formed of superposed plies of rubber reinforced with cords lying in radial planes, and a patch including a reinforcing sheet formed of parallel cords embedded in rubber, said sheet being adhered to the interior wall of said tire with said parallel cords oriented in radial planes and extending from bead to bead to reinforce said carcass in a damaged area thereof.

7. In combination, a pneumatic tire having a carcass terminating in circular beads and being formed of superposed plies of rubber reinforced with cords lying in radial planes, and a patch including a radial reinforcing sheet formed of parallel cords embedded in rubber, said radial sheet being adhered to the interior wall of said tire with its parallel cords oriented in radial planes and extending from bead to bead, and a circumferential reinforcing sheet formed of parallel cords embedded in rubber, said circumferential sheet being adhered to the interior wall of said tire with its parallel cords oriented circumferentially of said tire, said sheets providing reinforcement in the vicinity of said patch.

References Cited by the Examiner

UNITED STATES PATENTS

| | | | |
|---|---|---|---|
| 2,866,494 | 12/1958 | Sanderson | 156—97 |
| 2,974,715 | 3/1961 | Soares et al. | 156—97 |
| 3,004,580 | 10/1961 | Chambers et al. | 152—367 |
| 3,160,194 | 12/1964 | Barrett | 152—367 |
| 3,198,234 | 8/1965 | Massoubre | 152—367 |

ARTHUR L. LA POINT, *Primary Examiner.*

C. W. HAEFELE, *Assistant Examiner.*